United States Patent Office 3,197,302
Patented July 27, 1965

3,197,302
SOLUBLE FERTILIZER COMPOSITION
John E. MacBride, Ellicott City, Md., assignor to W. R. Grace & Co., a corporation of Connecticut
No Drawing. Filed Nov. 2, 1962, Ser. No. 235,147
4 Claims. (Cl. 71—37)

The present invention relates to plant fertilizers, and more specifically to novel plant fertilizer compositions which are readily soluble in water and may be quickly and conveniently applied to a variety of plants.

In recent years considerable interest has developed in fertilizer compositions which may be quickly dissolved in water and applied to plants in the form of an aqueous solution. Such fertilizer, i.e. plant food, solutions are particularly convenient for application to potted plants and young bedded plants which require frequent and accurately measured applications of readily available fertilizer materials.

To meet the need for readily water-soluble plant foods, the industry has provided several lines of fertilizer materials which may be admixed with water by the consumer for application. These water soluble fertilizers are prepared in various forms such as powder, flake, pellet, and more recently tablet form. The tablet form is particularly attractive to those who grow plants on a relatively small scale, that is, the average householder who grows a few potted plants and occasionally a small outside garden. To prepare a desired fertilizer solution, the house-holder need only dissolve the tablet in a specified amount of water. Such procedure requires no measuring of the fertilizer component.

While prior art fertilizer solutions are convenient for application, it is frequently found that the preparation of the solutions requires considerable mixing on the part of the user to obtain a complete solution. This difficulty is particularly apparent in the use of prior art fertilizer tablets. These tablets must frequently be broken down into small pieces before complete solution can be achieved. In the eyes of the consumer this difficulty in obtaining dissolution of a tablet often off-sets the convenience of premeasurement.

It is therefore an object of the present invention to provide plant food compositions which are readily soluble in water.

It is a further object to provide a plant food tablet which dissolves quickly in water without any externally applied physical mixing.

It is another object to provide a novel method by which aqueous solutions of plant fertilizers may be conveniently applied to plants. It is a still further object to provide a novel packaged plant food preparation which is convenient to use and possesses considerable consumer appeal.

It is still another object of the invention to provide a series of readily water-soluble plant fertilizer compositions which may contain any desired ratio of available nitrogen, phosphorus, and potassium, as well as essential trace elements, and in addition provide the acidic or basic condition required by any type of plant growth.

It is still a further object to provide a means for identifying fertilizer compositions having various ingredients.

It is yet a further object to provide a novel method for putting conventional water-soluble fertilizer components into aqueous solution.

These and still further objects of the present invention will become readily apparent to one skilled in the art in the following detailed description and specific examples.

Broadly, the present invention contemplates novel effervescent fertilizer compositions which comprise (1) an ammonium or alkali metal carbonate, (2) a solid acid yielding compound having sufficient acidic strength to liberate carbon dioxide from the aforementioned carbonate, and (3) a water soluble plant nutrient compound capable of yielding the desired ratios of essential growth elements. In a preferred embodiment an ammonium carbonate is used in conjunction with an acid potassium phosphate to inherently obtain essential N, P, K (nitrogen as N, phosphorus $P_2O_5$, potassium as $K_2O$) constituents from carbon dioxide producing, i.e. effervescent materials. It is also desirable to form the present novel composition into a coherent tablet or pellet so as to insure intimate contact of the materials.

More specifically, I have found that if water-soluble plant nutrient compounds are intimately admixed with a carbon dioxide liberating system of solid compounds, a fertilizer composition may be obtained that spontaneously effervesces and goes into solution upon contact with water. It is found that the rapid evolution of carbon dioxide from the included carbonate and acid materials provides ample agitation and breaking forces to achieve rapid and complete solution of the fertilizer ingredients.

Carbonates which may be used in the practice of the invention are ammonium, and alkali metal carbonates and bicarbonates such as sodium, ammonium, or potassium bicarbonate, or sodium ammonium or potassium carbonate having the formulae $NaHCO_3$, $NH_4HCO_3$, $KHCO_3$, $Na_2CO_3$, $(NH_4)_2CO_3$, and $K_2CO_3$.

Acid yielding compounds which may be used to liberate carbon dioxide gas from the aforementioned carbonates are inorganic acid salts such as ammonium, sodium, or potassium bisulphate, monohydrogen phosphate, or dihydrogen phosphate having the formulae $NH_4HSO_4$, $NaHSO_4$, $KHSO_4$, $(NH_4)_2HPO_4$, $Na_2HPO_4$, $K_2HPO_4$, $NH_4H_2PO_4$, $NaH_2PO_4$, and $K_2HPO_4$. Solid organic acids which may be used as the acidic ingredients of the present invention are oxalic, succinic, tartaric, phthalic, benzoic and so forth. In general, it may be said any solid organic or inorganic acid yielding compound may be used that will react with the aforementioned carbonates to yield carbon dioxide gas.

As indicated previously a preferred embodiment of the invention involves selecting carbonate and acid compounds which inherently contain the essential N, P, K elements required for plant growth in available form. Thus, of the above carbonates, the ammonium and potassium carbonates are most useful. Of the acid compounds mentioned above, desirable choices are ammonium and potassium acid phosphates.

Although the present compositions may be composed exclusively of N, P, K yielding compounds, it should be understood my invention contemplates utilization of non-N, P, or K yielding carbon dioxide producing systems in combination with conventional fertilizer materials. Thus, for example, a carbon dioxide liberating system composed of sodium bicarbonate and sodium acid sulfate may be used to produce or generate carbon dioxide gas and cause the agitation required to dissolve conventional non-effervescing fertilizer materials such as ammonium sulfate, ammonium nitrate and urea. Furthermore, the present invention contemplates the addition of conventional water-soluble N, P, K yielding compounds in conjunction with the preferred ammonium or potassium carbonate and ammonium or potassium acid phosphate carbon dioxide producing systems.

It is seen that by combining the desired amounts of conventional N, P or K yielding materials with the presently intended carbon dioxide effervescent systems, any ratio of N, P, K may be obtained. Conventional nitrogen, phosphorus, potassium yielding materials which may be used are urea, formaldehyde modified urea, ammonium sulfate, ammonium phosphate, including the aforementioned ammonium acid phosphates, ammonium nitrate, potassium phosphates, the various sodium phosphates, potassium chloride, potassium sulfate, and potassium nitrate. Furthermore, trace element compounds which yield required amounts of iron, calcium, sulfur, manganese, copper, zinc, boron, molybdenum, and cobalt may be added.

In view of the fact the present invention uses both acidic and basic compounds to produce the desired carbon dioxide evolution, it is found that an excess of either acid or base will yield any pH condition required for a particular type plant. When it is desired to obtain a neutral solution, stoichiometric amounts of acid and carbonate may be used. Generally, to obtain the optimum amount of carbon dioxide evolution from the carbonate and acid compound used, it is normally desired to admix these constituents in stochiometric amounts (provided only a neutral fertilizer composition or solution is required).

Generally speaking, sufficient amounts of carbon dioxide yielding materials are used in conjunction with non-carbon dioxide yielding materials to provide sufficient agitation and breaking force to secure complete solution. The precise amount of carbon dioxide yielding material used will depend on the solubility, particle size, etc., of the fertilizer compounds used. Ordinarily at least about 1 part by weight of a effervescing material per part of non-effervescing material will provide satisfactory results.

While the present compositions may be used in particulate or powdered form, it is preferred that the components be pressed into a single tablet or pellet. Such compaction achieves more intimate contact of the carbon dioxide liberating materials, and enhances the vigorous evolution of gas. The tablets may be formed by simply combining the powdered components and subjecting them to mechanical pressure in a suitable forming die. If desired, small amounts of binding materials such as clay, sugar, and so forth, may be added to provide a mechanically stronger tablet.

A convenient way to identify various compositions with respect to fertilizer content or acidity is to add a small amount of water-soluble dye.

Another refinement with respect to preparing a commercially acceptable product is to package the individual tablets or individual amounts of powdered materials into packages which contain a pre-measured amount of fertilizer in a sealed waterproof capsule. The present compositions must be stored under anhydrous conditions to prevent undesired liberation of carbon dioxide and the subsequent degradation of the product. Thus, a compartmentized sealed package of any water impervious synthetic resin film such as polyethylene is preferred. A further advantage obtained from a plastic wrapper is that if water should reach the tablets, a shattering explosion, such as would occur in a semi-sealed glass container, would not take place.

A novel method for applying the present composition to plants is also envisioned. The present compounds may be added to water in a closed container which is vented to the atmosphere only through a spray nozzle. The evolution of the carbon dioxide supplies the pressure required to effect spray applications of the fertilizer solution to the plants being treated.

Having set forth the basic aspects of the present invention, the following examples are given to illustrate specific embodiments thereof.

*Example 1*

A mixture comprising 63.5 parts by weight of monobasic potassium phosphate [$KH_2PO_4$] was admixed with 36.5 parts by weight of ammonium bicarbonate [$NH_4HCO_3$]. The materials as mixed were in a fine particulate form and completely dry. Subsequent to thorough mixing of the components, the powder was placed in a forming die which measured approximately 1 inch across and about ½ inch in thickness. The powder was pressed under sufficient force to obtain a coherent tablet. This tablet when dropped into water immediately started to generate carbon dioxide. Within 5 seconds after hitting the water, tablet was completely dissolved and a uniform solution of the ingredients was obtained. The solution was found to have a neutral pH and the ratio of nitrogen to phosphorous to potassium is 6.5–33–22.

*Example 2*

A powdered composition comprising 38.3 parts by weight of monobasic potassium phosphate, 22.3 parts ammonium bicarbonate, 33.6 parts urea, and 3.79 parts of a finely divided clay binder were intimately admixed, then pressed into tablets approximately 1 inch in diameter by ½ inch in thickness. The fertilizer composition ratio of these tablets, with respect to nitrogen, phosphorous, and potassium, was 20–20–13. These tablets when immersed in water immediately broke up into fine particles with the rapid evolution of carbon dioxide. Complete solution of the ingredients was obtained within 8 seconds after the tablet was immersed in water.

*Example 3*

A fertilizer composition comprised of 40 parts by weight of monobasic potassium phosphate, 23 parts ammonium bicarbonate, 30 parts diammonium sulfate, and 6.99 parts of finely divided clay binder was thoroughly admixed and pressed into round tablets having 1 inch diameter and approximately ½ inch thickness. The fertilizer content of these tablets with respect to nitrogen, phosphorous and potassium was 10–20–14. These tablets when immersed in water immediately caused vigorous evolution of carbon dioxide and were substantially dissolved within 5 seconds.

*Example 4*

50 parts by weight of a conventional 20–20–20 fertilizer comprising soluble urea, diammonium phosphate, potassium nitrate, sodium tri-poly phosphate, potassium sulfate and potassium chloride was admixed with 200 parts by weight of sodium bicarbonate [$NaHCO_3$] and sodium acid sulfate [$NaHSO_4$] then pressed into 1 inch diameter tablets having ½ inch thickness. These tablets when immersed in water immediately dissolved with vigorous evolution of carbon dioxide. Solution was complete in about 5 seconds.

*Example 5*

A tablet prepared in accordance with Example 1 was dropped into a container containing 1 quart of water at room temperature. A cover was immediately placed upon the container which was equipped with a material tube. This tube passed beneath the surface of the solution within the container. The material tube was connected to a spray nozzle which was used to apply the fertilizer solution to growing plants which was forced out by evolved gas pressure.

*Example 6*

The tablets of Example 1 were placed upon a sheet of polyethylene approximately 2½ mills in thickness. A covering sheet of polyethylene was applied over the top of the tablets and a heated ring die slightly larger than the diameter of the tablets was pressed upon the top sheet. The pressing operation sealed the top sheet with the lower sheet and caused the tablet to become completely incapsulated in the polyethylene film. This packaged product was completely impervious to moisture and could be stored over extended periods of time without degradation.

The above specific examples clearly illustrate that by following the teachings of the present invention, rapidly soluble fertilizer compositions which spontaneously go into solution upon contact with water may be easily and conveniently prepared.

I claim:
1. A substantially dry, self-dissolving effervescent fertilizer composition comprising:
   (1) a carbon dioxide liberating composition containing substantially stoichiometric amounts of (a) a carbonate selected from the group consisting of ammonium carbonate, potassium carbonate, sodium carbonate, ammonium bicarbonate, potassium bicarbonate, sodium bicarbonate, and (b) an acidic compound selected from the group consisting of ammonium acid sulfate, potassium acid sulfate, sodium acid sulfate, ammonium acid phosphate, potassium acid phosphate, sodium acid phosphate, oxalic acid, succinic acid, tartaric acid, phthalic acid and benzoic acid; and
   (2) a water-soluble plant nutrient,
   said carbon dioxide liberating composition being present in amounts at least equal in weight to said water-soluble plant nutrient.

2. The composition of claim 1 wherein the carbonate is ammonium bicarbonate, the acidic compound is potassium acid phosphate, and the water-soluble plant nutrient is selected from the group consisting of ammonium bicarbonate and potassium acid phosphate.

3. The composition according to claim 1 wherein the carbonate is ammonium bicarbonate, the acidic compound is ammonium acid sulfate, and the plant nutrient is selected from the group consisting of ammonium bicarbonate and ammonium sulfate.

4. The composition of claim 1 wherein said carbonate is sodium bicarbonate, the acidic compound is sodium acid sulfate, and said water-soluble plant nutrient is a fertilizer composition comprising urea, ammonium acid phosphate, potassium nitrate sodium tripolyphosphate, potassium sulfate, and potassium chloride.

References Cited by the Examiner

UNITED STATES PATENTS

| | | | |
|---|---|---|---|
| 1,038,316 | 9/12 | Dokkenwadel | 71—64 |
| 1,538,910 | 5/25 | Stokes | 71—64 |
| 1,611,072 | 12/26 | Reinau | 71—64 |
| 2,091,993 | 9/37 | Jones | 71—64 |
| 2,117,808 | 5/38 | Jones | 71—64 |
| 2,270,518 | 1/42 | Ellis et al. | 71—1 |
| 2,350,982 | 6/44 | Borst | 71—1 |
| 2,501,260 | 3/50 | Brodin | 71—1 |
| 2,738,265 | 3/56 | Nielsson | 71—39 |
| 2,899,293 | 8/59 | Munekata | 71—39 |
| 3,000,724 | 9/61 | Langlois | 71—39 |
| 3,050,384 | 8/62 | Bigot | 71—39 |

DONALL H. SYLVESTER, *Primary Examiner.*

ANTHONY SCIAMANNA, *Examiner.*